United States Patent
Olsen

(10) Patent No.: US 7,644,264 B1
(45) Date of Patent: Jan. 5, 2010

(54) METHOD AND SYSTEM FOR CREATING AND DEPLOYING DISK IMAGES

(75) Inventor: Larry Olsen, Eagle Mountain, UT (US)

(73) Assignee: Symantec Corporation, Mountain View, CA (US)

( * ) Notice: Subject to any disclaimer, the term of this patent is extended or adjusted under 35 U.S.C. 154(b) by 458 days.

(21) Appl. No.: 11/550,327

(22) Filed: Oct. 17, 2006

(51) Int. Cl.
*G06F 15/177* (2006.01)

(52) U.S. Cl. .............................. 713/2; 713/1; 710/104; 717/178; 719/321; 719/327

(58) Field of Classification Search ...................... 713/1, 713/2, 100, 104; 719/321, 327; 717/178; 710/104
See application file for complete search history.

(56) References Cited

U.S. PATENT DOCUMENTS

| | | | |
|---|---|---|---|
| 7,174,447 B2 * | 2/2007 | Zimmer et al. ................. | 713/1 |
| 7,181,610 B2 * | 2/2007 | Zimmer et al. ................. | 713/2 |
| 7,243,224 B2 * | 7/2007 | Nair et al. ...................... | 713/2 |
| 7,293,168 B2 * | 11/2007 | Maeda et al. .................. | 713/1 |
| 2003/0204714 A1 * | 10/2003 | Rothman et al. ............ | 713/100 |
| 2007/0101342 A1 * | 5/2007 | Flegg et al. .................. | 719/321 |

OTHER PUBLICATIONS

"The Power of One," www.uiu4you.com/; Universal Imaging Utility/Big Bang LLC (12//012006).
"The Power of One," www.uiu4you.com/about_us.html; Universal Imaging Utility/Big Bang LLC and Binary Research Inter . . . (Dec. 1, 2006).
"The Power of One," www.uiu4you.com/uiu_description.html; Universal Imaging Utility Product Description/Big Bang LLC (Dec. 1, 2006).
"The Power of One," www.uiu4you.com/uiu_general_faqs.html; Universal Imaging Utility Frequently Asked Questions/Big Bang LLC (Dec. 1, 2006).
"The Power of One," www.uiu4you.com/uiu_release_notes.html; Universal Imaging Utility Release Notes/Big Bang LLC (Dec. 1, 2006).
The Power of One, "About the Universal Imaging Utility," www.binaryresearch.net/UIU/About.html; Universal Imaging Utility (Dec. 1, 2006).

(Continued)

*Primary Examiner*—Thuan N Du
(74) *Attorney, Agent, or Firm*—Advantedge Law Group

(57) ABSTRACT

An exemplary computerized method is disclosed, comprising booting a destination computer in a pre-boot mode after a disk image comprising a first operating system is downloaded to the destination computer, initiating an identification module in the pre-boot mode to identify a device of the destination computer, receiving a device identifier of the device of the destination computer, identifying, using the device identifier, a driver compatible with the device, and downloading the driver to the destination computer before the destination computer is booted into the first operating system of the disk image for the first time. The method may also comprise receiving a hardware-abstraction-layer identifier of a hardware-abstraction layer of the destination computer, identifying a hardware-abstraction-layer file compatible with the hardware-abstraction layer of the destination computer, and downloading the hardware-abstraction-layer file to the destination computer. Corresponding computer-readable mediums and systems for deploying a disk image are also disclosed.

18 Claims, 9 Drawing Sheets

OTHER PUBLICATIONS

Universal Imaging Utility, "Universal Imaging Utility Features," www.binaryresearch.net/UIU/Features.html; Universal Imaging Utility (Dec. 1, 2006).

Ybarra, M., "Hardware Independent Imaging (HII) and LANDesk® Management Suite," LANDesk Group Ltd., pp. 1-7 (Jan. 5, 2003).

Ybarra, M., "Hardware Independent Imaging (HII) and LANDesk® Management Suite," LANDesk Group Ltd., pp. 1-17 (Sep. 8, 2003).

Atrinsic Solutions™, the enterprise framework experts, "HIIS hardware independent imaging solution," www.atrinsicsolutions.com/products/his/index.html (Dec. 1, 2006).

"Hardware-Independent Cloning: Leveraging the Power of One, Single-Image Cloning With the Universal Imaging Utility," Binary Research International, Inc., pp. 1-4 (2006).

"Global Backup and Recovery Expertise, The world's fastest backup and disaster recovery software," www.cristie.com/index.php?id=26&tx_ttnews%5btt_news%5...; Cristie Data Products—Global Backup and Recovery Experties: C . . . (Dec. 1, 2006).

"CBMR 5.0 for Windows, Fast, reliable, automated backup and recovery," cristie bare machine recovery CBMR, 2 pages (Jul. 2006).

* cited by examiner

METHOD AND SYSTEM FOR CREATING AND DEPLOYING DISK IMAGES

BACKGROUND

Disk imaging is a critical information technology tool for many enterprises. Disk imaging can refer to the process of replicating the information on a source disk, resulting in the creation of a disk image. By creating and deploying a disk image, which may be a computer file that typically contains the data and structure of the source disk, network managers may avoid the timely task of individually configuring every computer in a network. Disk imaging may greatly simply network maintenance, software deployment, software migration, disaster recovery, and many other network management tasks.

Network managers often use disk imaging to deploy and update operating systems and other software on multiple computers. For example, a network manager may want to install and configure a new version of an operating system on twenty computers. Without using a disk imaging tool, a network manager may need to individually setup the operating system on each of the computers. This can be a long, tedious process. In contrast, the network manager may install the operating system on a source computer and configure the source computer as desired. Then, the network manager can create an image of the source computer and deploy the image to the other nineteen computers (known as destination computers). Typically, the configuration of each of the nineteen destination computers will be the same as the configuration of the source computer. Ideally, the network manager saves time by eliminating the need to configure each of the nineteen destination computers.

But we do not live in an ideal world. The nineteen destination computers often include many different hardware configurations. For example, some of the destination computers may be updated with newer hardware than the source computer or other destination computers. Some destination computers may also include hardware devices not installed on any of the other destination computers. In addition, one destination computer may include a dual core processor while the others include single core processors. These hardware differences present significant challenges in deploying a disk image.

When a source computer has a different hardware configuration than a destination computer, the image may not include all the files the destination computer needs to run properly. For example, if a destination computer includes a device not found on the source computer, the image might not contain the drivers required for the device to operate. In many cases, the destination computer may not be able to boot when device drivers are missing from the image. Thus, the network manager may have to fix these hardware compatibility problems on many computers after deploying a disk image. This process may take the network manager more time than it would have taken to individually install and configure the operating system on each of the destination computers.

SUMMARY

In at least one embodiment, a computerized method may comprise booting a destination computer in a pre-boot mode after a disk image comprising a first operating system is downloaded to the destination computer, initiating an identification module in the pre-boot mode to identify a device of the destination computer, receiving a device identifier of the device of the destination computer, identifying, using the device identifier, a driver compatible with the device, and downloading the driver to the destination computer before the destination computer is booted into the first operating system of the disk image for the first time. In certain embodiments, the identification module may be configured to output device identification numbers for each device of the destination computer.

According to at least one embodiment, receiving a device identifier may further comprise receiving device identifiers for each device of the destination computer. In addition, downloading the driver to the destination computer may further comprise downloading drivers compatible with each device of the destination computer. The computerized method may also comprise receiving a hardware-abstraction-layer identifier of a hardware-abstraction layer of the destination computer, identifying a hardware-abstraction-layer file compatible with the hardware-abstraction layer of the destination computer, and downloading the hardware-abstraction-layer file to the destination computer. The method may also further comprise receiving a platform identifier of a platform of the disk image and using the platform identifier to identify the driver.

In certain embodiments, receiving the device identifier, identifying the driver, and downloading the driver are each performed by a deployment server. In addition, identifying the driver may further comprise comparing the driver identifier to a driver library index entry. In at least one embodiment, the pre-boot mode may be a command line mode and the first operating system of the disk image may be a graphical-user-interface operating system.

In an additional embodiment, a system for deploying a disk image may comprise a processor operative to boot a destination computer in a pre-boot mode after a disk image comprising a first operating system is downloaded to the destination computer, initiate an identification module in the pre-boot mode to identify a device of the destination computer, and identify, using a device identifier of the device, a driver compatible with the device. The system may also comprise a communication interface operative to download the disk image to the destination computer, receive the device identifier, and download the driver to the destination computer before the destination computer is booted into the first operating system of the disk image for the first time.

In an additional embodiment, a computer readable medium may comprise a first set of computer-executable instructions operable to boot a destination computer in a pre-boot mode after a disk image comprising a first operating system is downloaded to the destination computer, a second set of computer-executable instructions operable to initiate an identification module in the pre-boot mode to identify a device of the destination computer, a third set of computer-executable instructions operable to receive a device identifier of the device of the destination computer, a fourth set of computer-executable instructions operable to identify, using the device identifier, a driver compatible with the device, and a fifth set of computer-executable instructions operable to download the driver to the destination computer before the destination computer is booted into the first operating system of the disk image for the first time. The computer readable medium may also further comprise a sixth set of instructions operable to receive a hardware-abstraction-layer identifier of a hardware-abstraction layer of the destination computer, a seventh set of instructions operable to identify a hardware-abstraction-layer file compatible with the hardware-abstraction layer of the destination computer, and an eighth set of instructions operable to download the hardware-abstraction-layer file to the destination computer. Additionally or alternatively, the computer readable medium may further comprise a sixth set of instructions operable to receive a platform identifier of a platform of the disk image and a seventh set of instructions operable to use the platform identifier to identify the driver.

In at least one embodiment, the identification module may be configured to output device identification numbers for each device of the destination computer. In addition, receiving a device identifier may further comprise receiving device identifiers for each device of the destination computer and downloading the driver to the destination computer may further comprise downloading drivers compatible with each device of the destination computer.

In an additional embodiment, a computerized method may comprise copying a first driver from a source computer, including the first driver in a driver library, and downloading the first driver to a destination computer after a disk image of the source computer is installed on the destination computer. The method may also further comprise initiating a disk imaging module operable to image a disk of the source computer, receiving the disk image from the source computer, and downloading the disk image to a destination computer. In addition, the method may further comprise scanning the disk of the source computer for device information files and reading a device information file associated with a source computer device to identify the first driver.

In at least one embodiment, including the first driver in the driver library may further comprise indexing the first driver using a device identification number. In addition, the method may further comprise comparing the first driver with a second driver in the driver library to determine whether the first driver is newer than the second driver. The method may also further comprise separating a set of mass storage device drivers from other drivers in the driver library, downloading the set of mass storage device drivers to the source computer, and including mass storage device driver information in a system-preparation-information file. In addition, the method may further comprise initiating execution of a system-preparation module, creating the disk image of the disk of the source computer, and uploading the disk image.

In certain embodiments, the method may also further comprise copying a hardware-abstraction-layer file from a memory device containing a destination-device operating system and copying a deployment file from the memory device. The method may also further comprise receiving a device identifier of a destination device of the destination computer and identifying, using the device identifier, that the driver is compatible with the destination device. In at least one embodiment, downloading the first driver is performed before the destination computer is booted into a first operating system of the disk image for the first time.

In an additional embodiment, a computerized method may comprise booting a destination computer in a pre-boot mode after a disk image comprising a first operating system is downloaded to the destination computer, identifying a device of the destination computer while the computer is in the pre-boot mode, identifying a driver compatible with the device, and downloading the driver to the destination computer before the destination computer is booted into the first operating system of the disk image for the first time. The method may also further comprise receiving a model number of the destination computer, wherein identifying a device of the destination computer comprises identifying a device associated with the model number. In certain embodiments, downloading the driver to the destination computer further comprises downloading drivers compatible with each device associated with the model number. In addition, identifying a device of the destination computer may comprise initiating an identification module in the pre-boot mode.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
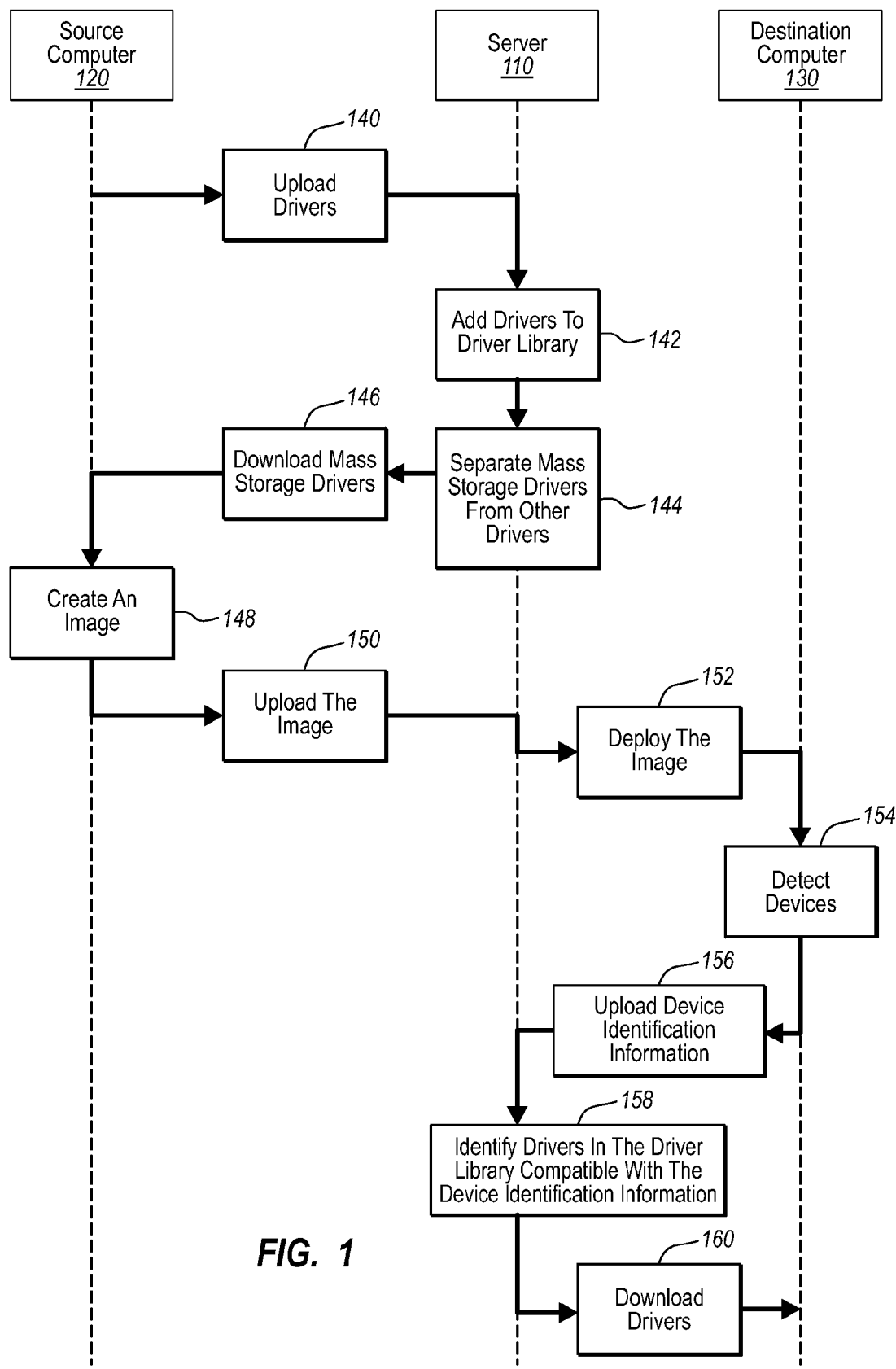
FIG. 1 is a flow diagram illustrating an exemplary method for creating and deploying a disk image according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, one of skill in the art will understand that the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The following is intended to provide a detailed description of various exemplary embodiments and should not be taken to be limiting in any way. For purposes of readability, this detailed description is organized into sections, with the following introduction providing an overview of exemplary embodiments for creating and executing software packages.

Introduction

Various exemplary methods and systems for creating and deploying disk images are described and/or illustrated herein. As discussed in greater detail below, embodiments of the instant disclosure may simplify disk imaging and deployment and conserve network resources. Some embodiments may provide hardware independent disk imaging. Furthermore, various embodiments may provide many other improvements over other types of disk imaging and deployment tools.

Figure 2:
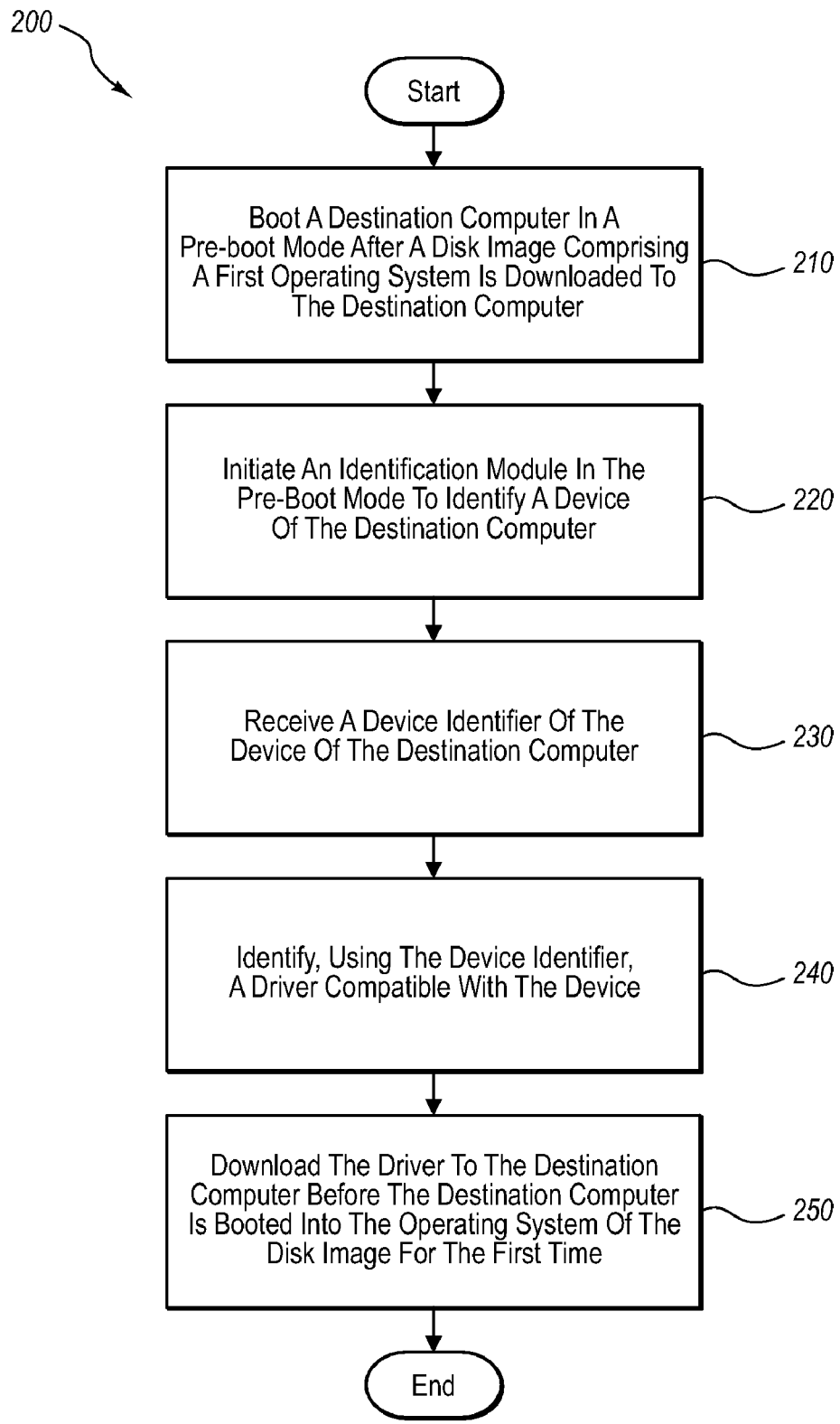
FIG. 2 is a flow diagram illustrating an exemplary method for identifying and downloading drivers after a disk image is downloaded to a destination computer according to certain embodiments.

FIGS. 1 and 2 provide an overview of some disk imaging features of various embodiments. FIG. 1 is an exemplary flow diagram showing steps that may be performed by and between a server 110, a source computer 120, and a destination computer 130. Steps illustrated along the dashed lines under each of server 110, source computer 120, and destination computer 130 may be performed at or on the respective server or computer. For example, step 144, which is illustrated along the line under server 110, may be performed by server 110. The solid lines terminating in arrows illustrate a sequential flow of steps according to certain embodiments. Steps shown along the solid lines between server 110, source computer 120, and destination computer 130 indicate communication and/or data transfer between these devices in some embodiments. The steps illustrated in FIG. 1 may be performed in a different order or by different computing devices than illustrated in FIG. 1.

According to certain embodiments, server 110 images a disk of source computer 120 and deploys the image of the source computer disk to destination computer 130. Server 110 may include image management and deployment software for initiating and performing the various steps shown in FIG. 1. Some of the steps may also be initiated or performed by source computer 120 and/or destination computer 130.

Figure 4:
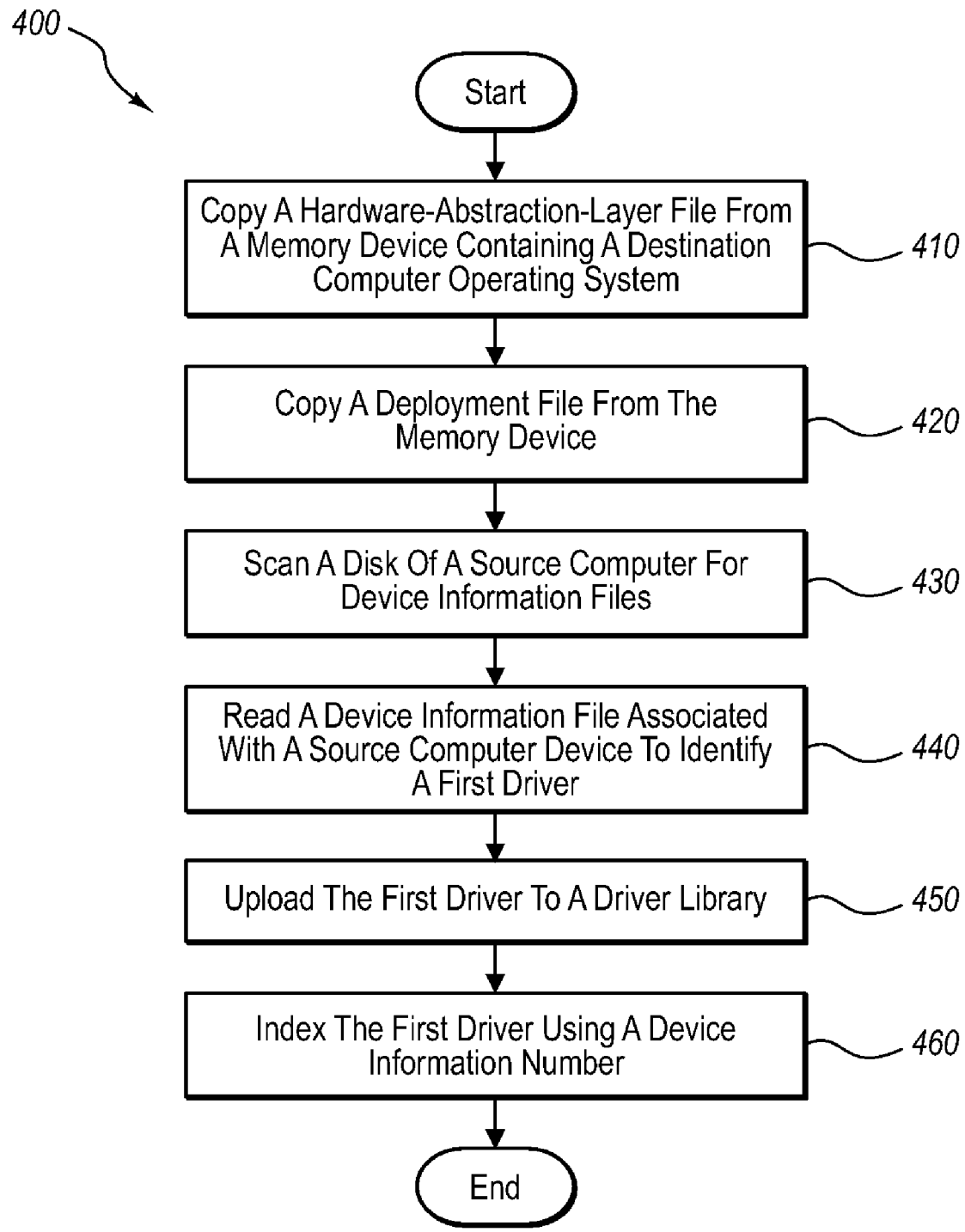
FIG. 4 is a flow diagram illustrating an exemplary method for collecting drivers from a source computer according to certain embodiments.

Server 110 may upload drivers from source computer 120 (step 140). The drivers uploaded to server 110 may also be referred to as device drivers or software drivers. A driver may be a computer file that allows an operating system to interact with a hardware device. For example, a driver may be an optical drive driver, a hard disk driver, an input device (e.g., mouse, keyboard, etc.) driver, a sound card driver, a printer driver, a modem driver, a game controller driver, a digital camera driver, a USB driver, a network adapter driver, a display driver, and any other type of hardware driver. The term "driver" may refer to a single device driver file or a set of device driver files that a device needs to function properly. In some embodiments, the drivers uploaded to server 110 may include drivers for each hardware device in source computer 120. In other embodiments, server 110 may only upload one driver or a few drivers. FIG. 4 and the corresponding description provide additional details about how drivers may be uploaded from a source computer.

Server 110 may add the drivers to a driver library (step 142) after receiving the drivers from source computer 120. The driver library may be a folder, a database, or any other directory structure for storing and organizing digital files. According to at least one embodiment, server 110 creates a driver library based on the drivers from source computer 120. In some embodiments, server 110 contains a driver library with a predefined set of drivers, and server 110 adds the drivers from source computer 120 to the predefined set of drivers. The drivers in the driver library may be indexed or organized based on driver identification numbers or any other driver identification data. As shown in FIG. 1, server 110 may separate the mass storage drivers from the other types of drivers (step 144). Mass storage drivers may be drivers for mass storage devices, such as hard drives, tape drives, and other mass storage drives and devices.

After the mass storage drivers are separated from the other types of drivers, server 110 may download the mass storage drivers to source computer 120 (step 146). This step may prepare the source computer to be imaged. In some embodiments, server 110 may send source computer 120 a set of mass storage drivers that contains many drivers for devices not found on the source computer. This may allow an image of the source computer to be compatible with a destination computer having a different mass storage device than the source computer.

Next, server 110 may image source computer 120 to create an image (step 148). As previously mentioned, imaging refers to the process of replicating the information on a source disk. Server 110 may use any type of imaging software application to create the image, and the image may be of a hard drive or other storage device of the source computer. Depending on the imaging software application, the image may be in any type of image format, including .BIN, .IMG, .NRG, .DAA, .UIF, .DMG, etc. In some embodiments, the image may be a replica of the data and structure of one or more disks on the source computer.

Server 110 may then upload the image of source computer 120 (step 150) and deploy the image to destination computer 130 (step 152). Server 110 may deploy the image to destination computer 130 by downloading the image to a drive of destination computer 130. Server 110 may also deploy the image to other destination computers. After sending the image to destination computer 130, server 110 may detect devices of destination computer 130 (step 154). Various techniques may be utilized to detect the devices of destination computer 130. For example, server 110 may boot destination computer 130 into a pre-boot mode and initiate an identification module on destination computer 130. The identification module may detect the devices installed on computer 130, as discussed in further detail below in connection with FIG. 6. In some embodiments, server 110 may identify a model number of destination computer 130. Server 110 may use the model number to identify devices installed on computer 130, as discussed in further detail in connection with FIG. 7.

After the drivers are detected, server 110 may upload device identification information from destination computer 130 (step 156) and use the device identification information to identify drivers compatible with the device identification information (step 158). Server 110 may identify compatible drivers by matching the device identification information, such as device identification numbers, to an index entry of the driver library. Server 110 may also implement other techniques, such as searching a driver database, to identify compatible drivers. Once the compatible drivers are identified, server 110 may download the drivers to destination computer 130 (step 160).

Some of the steps shown in FIG. 1, such as creating an image (step 148) may be performed by a software deployment application. In some embodiments, some of the steps may be performed by a driver preparation module that complements a pre-existing software deployment application. FIG. 2 illustrates some of the steps 200 that may be performed by a driver preparation module.

As illustrated in FIG. 2, the driver preparation module may boot destination computer 130 in a pre-boot mode after a disk image comprising a first operating system is downloaded to destination computer 130 (step 210). The driver preparation module may be executed by any type of computer or server (e.g., a deployment server, such as server 110). The driver preparation module may boot destination computer 130 in a pre-boot mode by initiating a booting sequence for destination computer 130. In some embodiments, driver preparation module boots destination computer 130 in the pre-boot mode after a disk image is installed on destination computer 130, but before additional drivers (i.e., drivers other than mass storage drivers and device drivers found in the disk image source computer) are downloaded to destination computer 130.

Once destination computer 130 is in the pre-boot mode, the driver preparation module may initiate an identification module to identify a device of destination computer 130 (step 220). The identification module may be a module contained in the system image. In some embodiments, the identification module is downloaded to source computer 120 before the image of source computer 120 is created. This may ensure that the identification module is available to destination computer 130 after the image is downloaded to destination computer 130. In at least one embodiment, the identification module is included in the operating system of source computer 120 and does not need to be downloaded to source computer 120 before creating the image.

The identification module may output device identifiers, such as hardware identification numbers, to a file. The file may then be uploaded to server 110. According to various embodiments, the identification module may output the device identifiers directly to server 110. The identification module may be a target analyzer, such as a TAP.EXE program or a TA.EXE program. Target analyzers may produce a comprehensive hardware inventory of destination computer 130. A target analyzer may provide a list of hardware device numbers of hardware devices installed on destination computer 130. A target analyzer may also indicate a hardware abstraction layer of destination computer 130.

The driver preparation module may then receive a device identifier of a device of destination computer 130 (step 230). As previously mentioned, the driver preparation module may receive the device identifier in a file or in any other suitable format. The driver preparation module then identifies, using the device identifier, a driver compatible with the device (step 240). Finally, the driver preparation module may download the driver to the destination computer before the destination computer is booted into the first operating system of the disk image for the first time (250).

When the driver is downloaded to the destination computer, the destination computer may be in a pre-boot mode, such as a command line mode. According to some embodiments, the pre-boot mode may be run in a command line operating system, such as a Disk Operating System (DOS), LINUX, or any other command line operating system capable of executing in a pre-boot mode. In these embodiments, the pre-boot mode may be referred to as a second operating system of the disk image. In at least one embodiment, a pre-boot mode may also be a Pre-boot Execution Environment (PXE), which may be a client/server interface that allows a client computer to be configured and booted remotely by a server.

As noted in the steps in FIG. 2, the driver may be downloaded to the destination computer after the disk image is downloaded but before the destination computer boots into the first operating system of the disk image for the first time. While the destination computer may have been started in a pre-boot mode, the first operating system may not fully launch until after the driver is downloaded. In some embodiments, the driver needs to be downloaded before destination computer 130 is booted into the first operating system because the first operating system might not function properly without the driver. The first operating system may be a Graphical User Interface (GUI) based operating system, such as MICROSOFT WINDOWS.

While the steps of FIG. 2 may be performed by a driver preparation module, the steps of FIG. 2 may also be computer executable instructions included in any other type of software application or module. For example, the steps of FIG. 2 may be directly performed by a disk deployment software application or any other type of network or imaging management software application.

Figure 3:
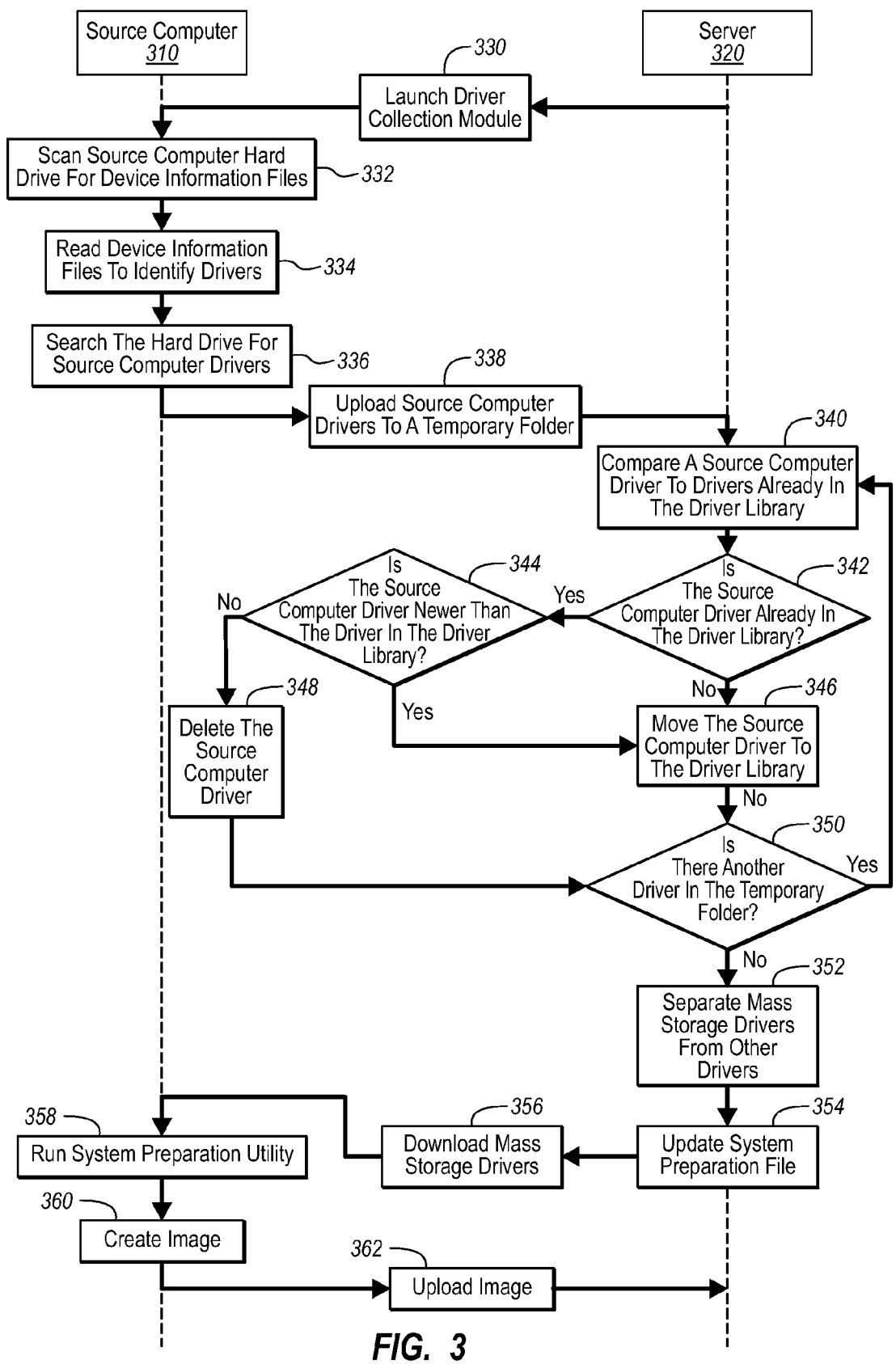
FIG. 3 is a flow diagram illustrating an exemplary method for collecting drivers and preparing a source computer to create a disk image according to certain embodiments.
Figure 5:
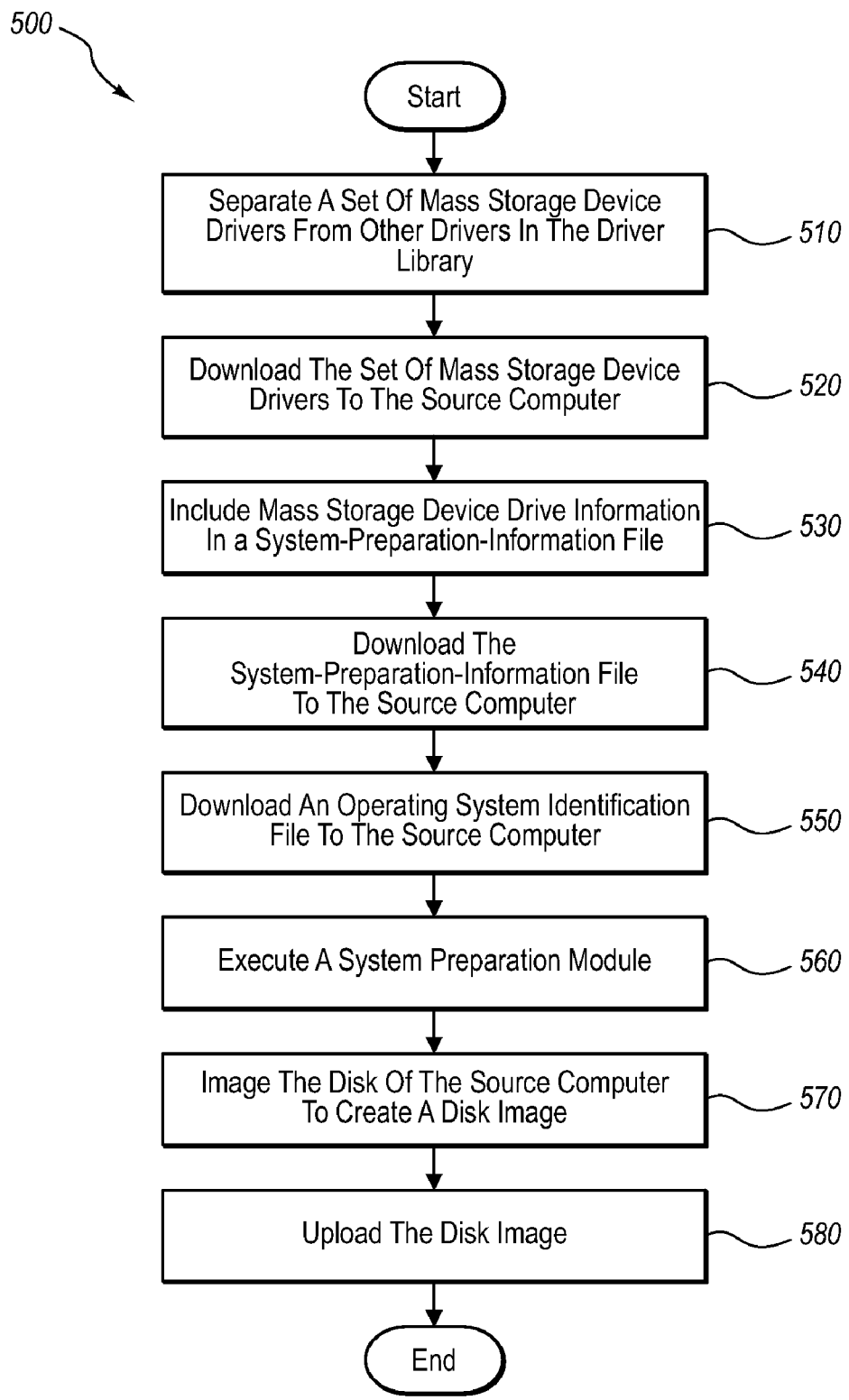
FIG. 5 is a flow diagram illustrating an exemplary method for creating a disk image according to certain embodiments.
Figure 6:
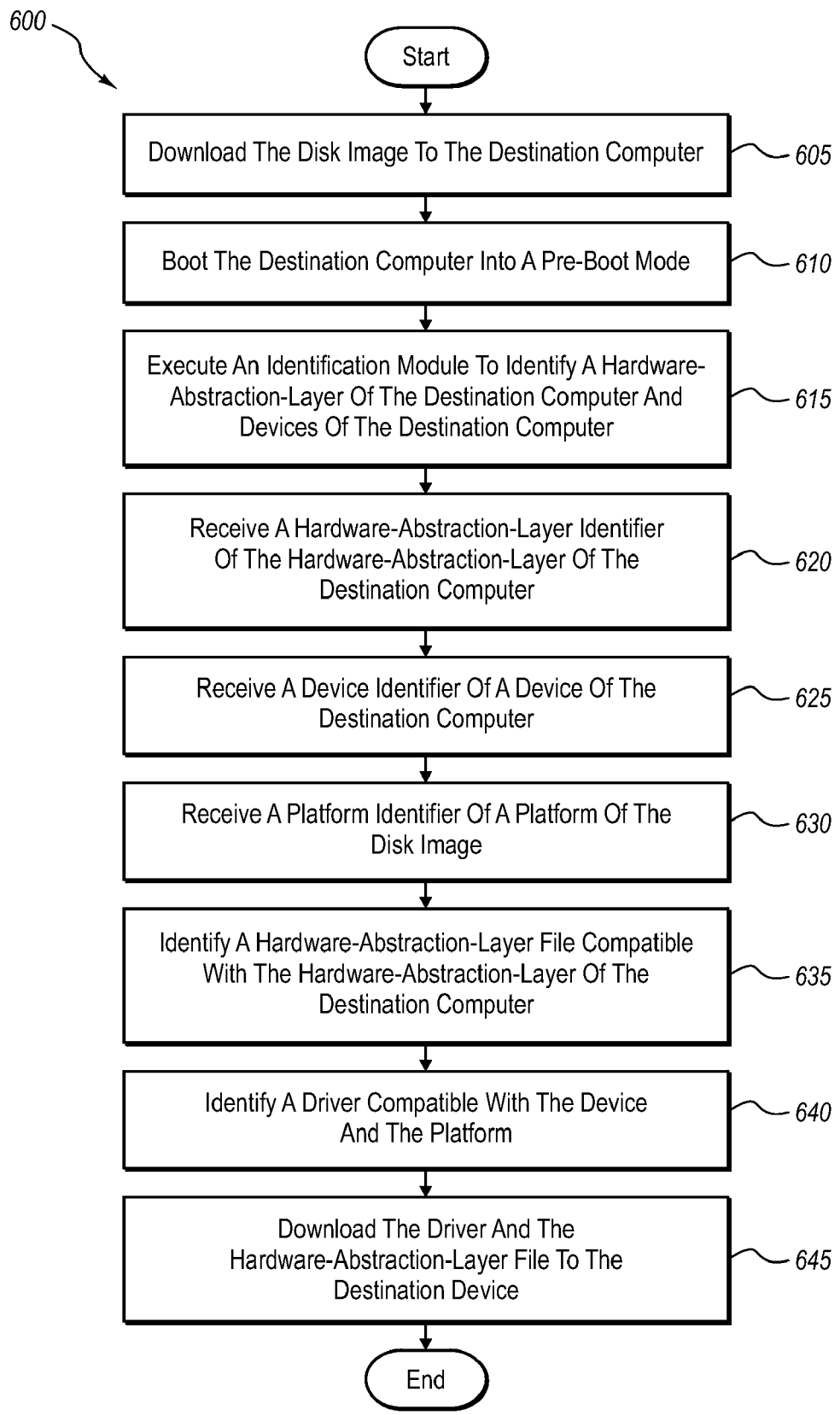
FIG. 6 is a flow diagram illustrating an exemplary method for deploying a disk image according to certain embodiments.
Figure 7:
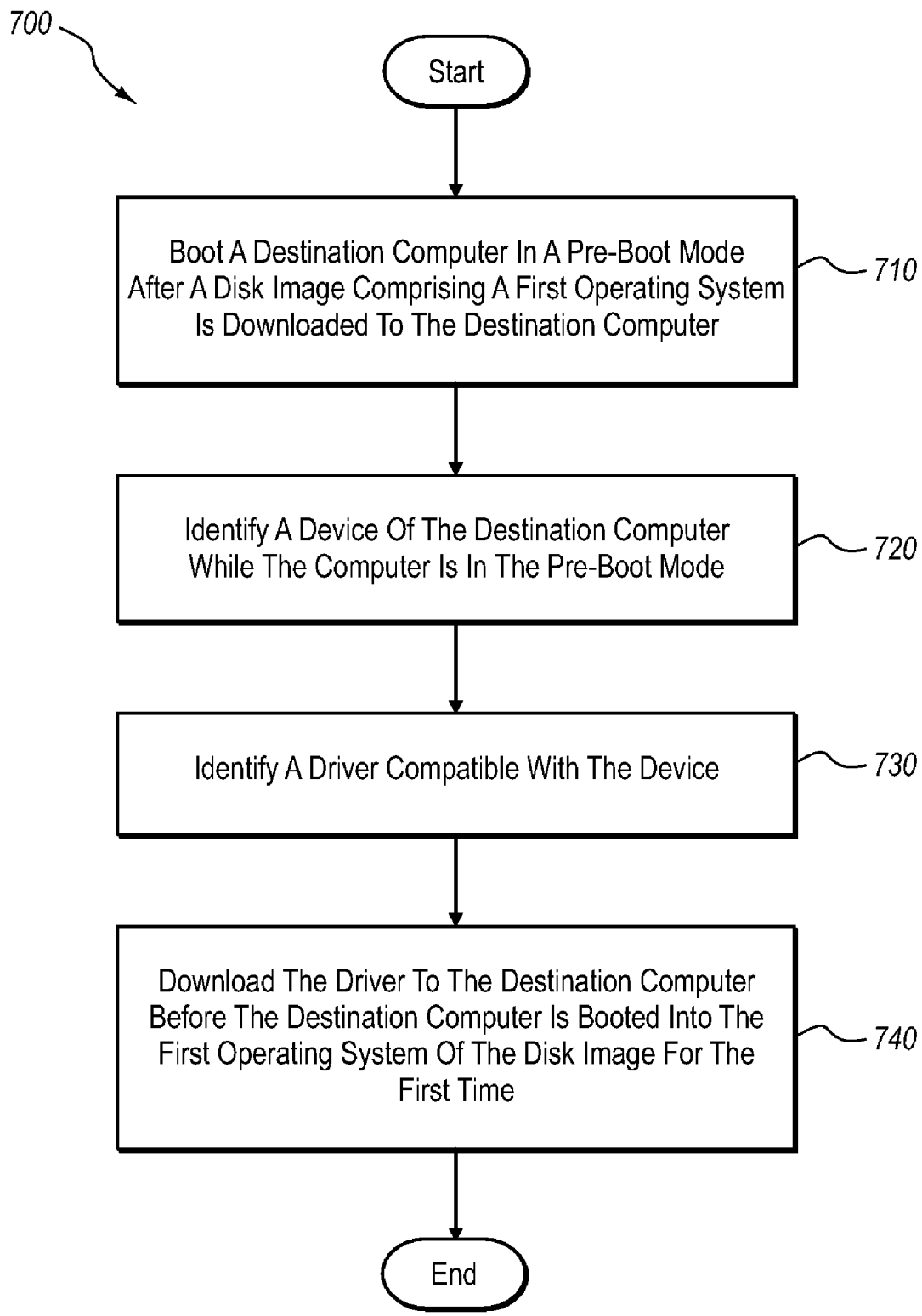
FIG. 7 is a flow diagram illustrating an exemplary method for deploying a disk image according to certain embodiments.

The steps illustrated in FIGS. 1 and 2 provide an overview of certain embodiments of creating and deploying disk images. In the following discussion, FIGS. 3-5 present additional embodiments for creating disk images and collecting drivers. FIGS. 6 and 7 present additional embodiments for deploying disk images (e.g., downloading disk images, preparing drivers, and/or downloading drivers). A discussion of an exemplary computer system and network for implementing one or more of the exemplary embodiments described and/or illustrated herein is then provided in connection with FIGS. 8 and 9.

Disk Image Creation

FIG. 3 is an exemplary flow diagram showing steps that may be performed by and between a source computer 310 and a server 320. Server 320 launches a driver collection module (step 330). The driver collection module may be an individual software application, may be part of a software utility that also includes a driver preparation module, or may be part of a disk imaging software application or any other suitable software application. In certain embodiments, the driver collection module may be a job or part of a job that is scheduled with a deployment server.

The driver collection module may scan the source computer hard drive for device information files (step 332). A device information file may be a file that provides information needed to set up a device. The information in a device information file may include a list of valid configurations for the device and the names of driver files associated with the device. A device information file may also contain registry settings and other installation information about a driver. An example of a device information file may be an .INF file, which is an information file used by MICROSOFT WINDOWS.

The driver collection module may then read the device information files to identify drivers for the devices installed on source computer 310 (step 334). After identifying the drivers listed in the device information files, the driver collection module may search the drive of source computer 310 to find the identified drivers (step 336), and the driver collection module may then upload the drivers to a temporary folder on server 320 (step 338). In certain embodiments, the drivers are uploaded directly to a driver library on server 320 instead of being uploaded to a temporary folder.

Server 320 may compare a driver from the source computer to drivers already in the driver library (step 340) to determine whether the source computer driver is already in the driver library (decision 342). If the source computer driver is not already in the driver library, the source computer driver may be moved from a temporary folder to the driver library (step 346). If the source computer driver is already in the driver library, server 320 may determine whether the source computer driver is newer (e.g., a new version of the driver) than the driver already in the driver library (decision 344). If the source computer driver is older than the driver already in the driver library, server 320 may delete the source computer driver (step 348). If the source computer driver is newer than the driver in the driver library, server 320 may move the source computer driver to the driver library (step 346). If there is another source computer driver in the temporary folder, server 320 may repeat steps 340-350 (decision 350). In certain embodiments, server 320 may copy files from the temporary folder to the driver library instead of deleting and moving the files.

As previously mentioned, the driver library may be a folder, a database, or any other directory structure for storing and organizing digital files. The drivers may be indexed or arranged by driver identification numbers. The following is an example of a hardware identification number:

PCI\VEN_8086&DEV_2449&SUBSYS_30138086&REV_02

In this example, the manufacturer of the device is denoted by VEN_8086, which may indicate INTEL. An example of the most generic level of device identification number may be VEN_8086&DEV_2449, which may represent INTEL PRO 100. A more specific device identification number might include device and sub-system information. For example, VEN_8086&DEV_2449&SUBSYS_30138086 may refer to INTEL PRO 100, VE. An even more specific device identification number may include a revision number. For example, VEN_8086&DEV_2449&SUBSYS_30138086&REV_02 may refer to INTEL PRO 100, VE, $2^{nd}$ revision.

The driver library may contain a list of compatible hardware identification numbers for each device. The hardware identification numbers in the list may be arranged in order from most specific to most generic or in any other suitable order. Furthermore, when a driver is added to the driver library, the hardware identification number list may be modified to include a reference to every operating system and hardware combination compatible with the driver. For example, the hardware identification number list for the $2^{nd}$ revision of INTEL PRO 100 VE may have the following format:

WINDOWS XP
VEN_8086&DEV_2449
VEN_8086&DEV_2449&SUBSYS_30138086
VEN_8086&DEV_2449&SUBSYS_30138086&REV_01
VEN_8086&DEV_2449&SUBSYS_30138086&REV_02
WINDOWS 2003
VEN_8086&DEV_2449
VEN_8086&DEV_2449&SUBSYS_30138086
VEN_8086&DEV_2449&SUBSYS_30138086&REV_02

In order to search for a driver in the library, server 320 may look for the most specific identifier and work back to most generic. For example, if server 320 is deploying WINDOWS 2003 and is looking for a driver for VEN_8086&DEV_2449&SUBSYS_30138086&REV_01, server 320 may use VEN_8086&DEV_2449&SUBSYS_30138086 since it is the most specific option available.

After all the source drivers are either deleted or added to the driver library, server 320 may separate the mass storage drivers from the other drivers to create a set of mass storage drivers (step 352). Server 320 may also create hard links, such as NTFS hard links, to save disk space. Hard links, which are references or pointers to physical data on a disk, may help save disk space when one driver can be used with multiple devices. Server 320 may also update a system preparation file. A system preparation file is a file that may be used with a system preparation utility. System preparation utilities may be software programs capable of preparing a source computer to be imaged. The system preparation file may be updated to reflect the set of mass storage drivers that will be downloaded to the source computer (step 354). An example of a system preparation file may be a SYSPREP.INF file for WINDOWS.

Server 320 may download the set of mass storage drivers to source computer 310 (step 356), and then source computer 310 may execute a system preparation utility (step 358). The system preparation utility may help to automate many steps in the imaging process. An example of a system preparation utility may be SYSPREP for WINDOWS. After the system preparation utility executes, an image of source computer 310 may be created (step 360). Server 320 may then upload the image (step 362) and deploy the image.

As illustrated by FIG. 3, many of the steps involved in creating a disk image may be performed by server 320 or source computer 310. In certain embodiments, the steps illustrated in FIG. 3 may be performed in a different order or by different computing devices than illustrated in FIG. 3.

FIG. 4 illustrates various steps 400 that may occur during the installation of a driver collection module. FIG. 4 also illustrates steps that may be performed by a driver collection module. A driver collection module may be installed on a deployment server (e.g., a server executing a software deployment application, such as server 310). During installation of the driver collection module, an installation utility may copy a hardware-abstraction-layer file from a memory device containing a destination device operating system (step 410). The installation utility may also copy a deployment file from the memory device (step 420). For example, the installation utility may copy a hardware-abstraction-layer file and a deployment file (e.g., a DEPLOY.CAB file) from a compact disk containing an operating system that will be imaged and deployed to a destination computer. In certain embodiments, steps 410 and 420 may be performed by a software application other than the installation utility.

After the driver collection module is installed, the driver collection module may scan a disk of source computer 310 for device information files (step 430). The driver collection module may then read a device information file associated with a device of source computer 310 to identify a first driver (step 440) and then upload the first driver to a driver library (step 450). Finally, the driver collection module may index the first driver using a device identification number (step 460).

FIG. 5 illustrates various steps 500 that may be performed by server 320 after the driver collection module executes. Server 320 may separate a set of mass storage device drivers from other drivers in the driver library (step 510) and then download the set of mass storage device drivers to source computer 310 (step 520). Server 320 may include mass storage device driver information in a system-preparation-information file (step 530) and download the system-preparation-information file to source computer 310 (step 540). Server 320 may then download an operating system identification file to source computer 310 (step 550). The operating system identification file may allow a driver preparation module to identify an operating system of an image of source computer 310 after the disk image is deployed to a destination computer.

The operating system identification file may simplify deployment of a disk image to a destination computer. Since the destination computer may boot in a pre-boot mode during the processes of finding and downloading drivers for the devices of the destination computer, server 320 may not have an indication of which operating system is included in the disk image. Server 320 may need to know which operating system is included in the disk image in order to find the drivers compatible with the devices of the destination computer and the operating system of the disk image. Thus, an operating system identification file may be included in the disk image. Alternatively, during deployment of the disk image, server 320 may use the sizes of various files included in the operating system of the disk image to determine which operating system is included in the disk image.

After downloading the operating system identification file, a system preparation module may be executed (step 560) and source computer 310 may be imaged to create the disk image (step 570). Finally, the disk image may be uploaded to server 320 (step 580). While the steps in FIG. 5 may be performed by server 320, some of these steps may also be performed by source computer 310 or by another computing device.

Disk Image Deployment

FIGS. 6 and 7 are exemplary flow diagrams of embodiments for deploying a disk image to a destination computer. FIG. 6 illustrates a disk image deployment process 600 that may identify destination computer devices by executing a driver identification module. FIG. 7 illustrates a disk image deployment process 700 that may utilize a destination computer model number, a driver identification module, or various other techniques to identify destination computer devices.

As illustrated in FIG. 6, a server may download a disk image to a destination computer (step 605), and the destination computer may be booted into a pre-boot mode (step 610). Then, an identification module may be executed to identify devices and a hardware abstraction layer of the destination computer (step 615). A device of the destination computer may be any device (e.g., a monitor, a sound card, an optical drive, a magnetic drive, a hard drive, a network card, any input device, any output device, etc.) installed on, coupled to, attached to, or otherwise associated with the destination computer.

A hardware abstraction layer is a software implemented layer that may provide for interaction between the hardware and the software of a computer. A hardware abstraction layer may mask differences in hardware from an operating system. In other words, a hardware abstraction layer may allow instructions from a higher level computer language to communicate with a lower level hardware component.

After the hardware abstraction layer and the devices are identified, the server may receive a hardware identification abstraction layer identifier of the hardware abstraction layer (step 620). The server may also receive a device identifier of a device of the destination computer (step 625). The server may then receive a platform identifier of a platform of the disk image (step 630). A platform may be an operating system (e.g., WINDOWS, SOLARIS, BSD, LINUX, MAC OS, etc.), a specific version of an operating system, or other software (e.g., a virtual machine, such as a Java virtual machine) capable of running a software program.

In at least one embodiment, the server may then identify a hardware-abstraction-layer file compatible with the destination computer (step 635), and the server may identify a driver compatible with the device and the platform (step 640). Finally, the driver and the hardware-abstraction-layer file may be downloaded to the destination device (step 645).

FIG. 7 is a flow diagram illustrating an exemplary method for updating drivers after a disk image is distributed. A server may boot a destination computer in a pre-boot mode after a disk image is downloaded to the destination computer (step 710). The disk image may include, among other data, a first operating system. The server may identify a device of the destination computer while the computer is in the pre-boot mode (step 720).

The server may identify the device of the destination computer using a variety of techniques. For example, the server may receive a model number of the destination computer. The server may include a database that indicates the devices that are typically installed on a particular computer model, and the server can use the model number to search the database and identify devices that may be installed on the destination computer. In other embodiments, the server may receive a device identifier from an identification module running on the destination computer.

Once the server identifies the device, the server may identify a driver compatible with the device (step 730). Then, the server may download the driver to the destination computer before the destination computer is booted into the first operating system of the disk image for the first time (step 740).

Computer System and Network

Figure 8:
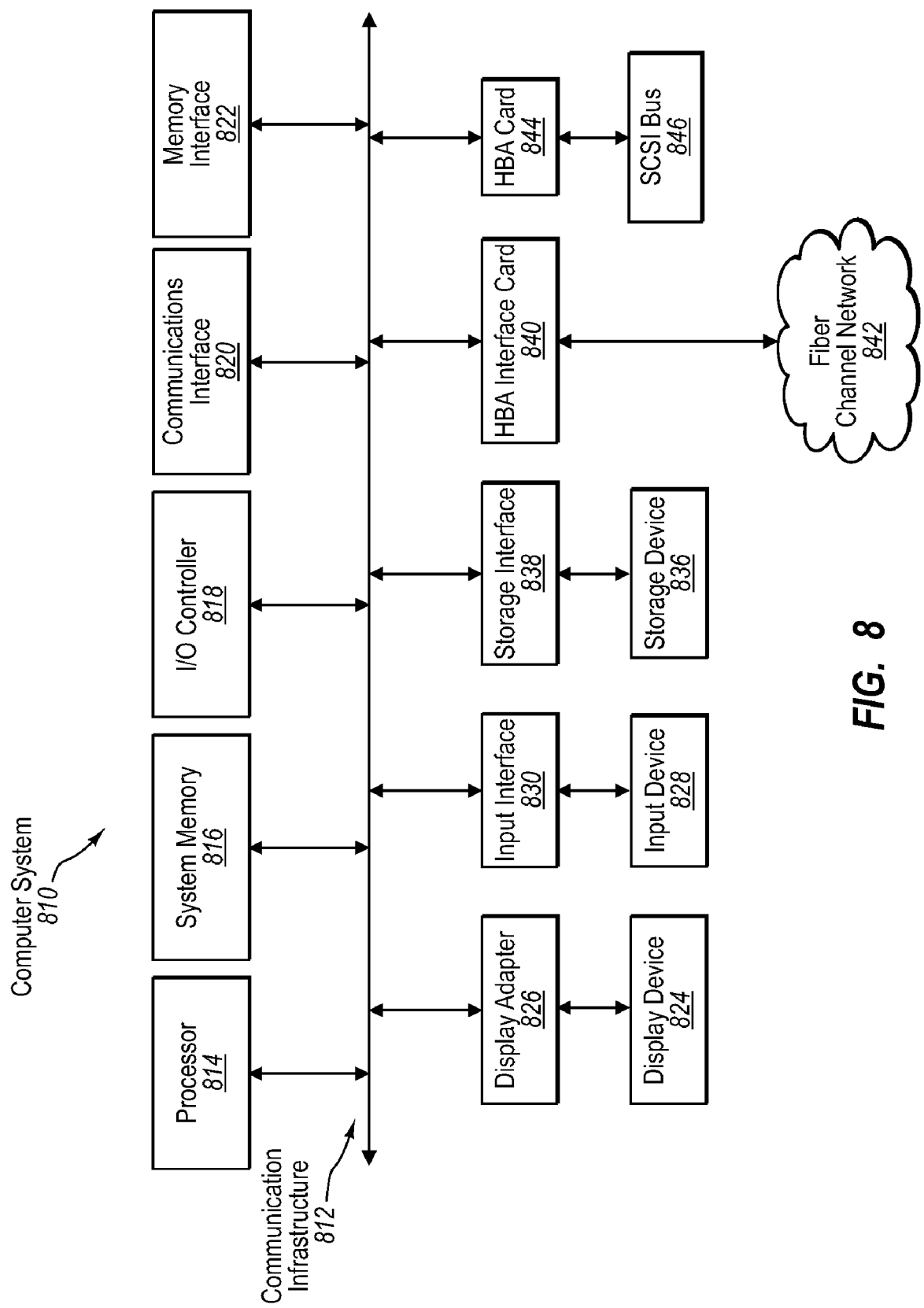
FIG. 8 is a block diagram of an exemplary computer system capable of implementing one or more of the exemplary embodiments described and/or illustrated herein.

FIG. 8 is a block diagram of an exemplary computer system 810 suitable for deploying a disk image, such as the exemplary disk images described herein. Computer system 810 generally represents any single or multi-processor computing device capable of executing single-threaded or multi-threaded applications. Computer system 810 may include a communication infrastructure 812 that interconnects the major subsystems of computer system 810. Communication infrastructure 812 generally represents any form or structure capable of facilitating communication between one or more electronic components; including, for example, a communication bus (e.g., ISA, PCI, AGP, etc.) or a network.

As illustrated in FIG. 8, exemplary computer system 810 may comprise a processor 814, a system memory 816, an Input/Output (I/O) controller 818, a communication interface 820, and a memory interface 822. Processor 814 generally represents any type or form of CPU or other computing device capable of interpreting instructions and processing data. Instructions provided to processor 814 may cause processor 814 to perform the functions of one or more of the exemplary embodiments described and/or illustrated herein. The instructions provided to processor 814 may be instructions from a software application or module. For example, processor 814 may execute the any of the modules or software applications (e.g., the driver collection module, the driver collection module, etc). Processor 814 may also be used, for example, to perform the booting, initiating, receiving, identifying, downloading, and/or other steps and features described herein.

System memory 816 generally represents any type or form of storage device or medium capable of storing data and/or other computer-readable instructions. Examples of system memory 816 include, without limitation, a random access memory (RAM) unit, a read only memory (ROM) unit, a flash RAM unit, or any other suitable memory device. In certain embodiments, system memory 816 may be used, for example, to receive identifiers, to store identifiers, to store drivers from a driver library, etc. I/O controller 818 generally represents any type or form of computer board or module capable of coordinating and/or controlling the input and output functions of a computing device. I/O controller 818 may be used, for example, to perform the booting, initiating, receiving, identifying, downloading, and/or other steps and features described herein.

Communication interface 820 generally represents a communication device capable of facilitating communication between exemplary computer system 810 and an additional device. For example, in certain embodiments, communication interface 820 may interconnect computer system 810 with a private or public network comprising additional computer systems. Examples of communication interface 820, include, without limitation, a network interface (such as a network interface card), a wireless card, a modem, a communications port (such as a USB or FIREWIRE port), and any other suitable interface. In at least one embodiment, communication interface 820 may provide a direct connection to a remote server via a direct network link to the Internet. Communication interface 820 may also provide such a connection through, for example, an Ethernet connection, a modem, a digital cellular telephone connection, a BLUETOOTH network, an IEEE 802.11x wireless network, a digital satellite data connection, or any other suitable connection.

Communication interface 820 may allow computer system 810 to engage in distributed or remote computing. For example, communication interface 820 may receive instructions from a remote computer, or communication interface 820 may send instructions to a remote computer for execution. Accordingly, communication interface 820 may be used to perform the booting, initiating, receiving, identifying, downloading, and/or other steps and features described herein.

Memory interface 822 generally represents any type or form of device capable of allowing software and data to be transferred from a storage device to other components of computer system 810. For example, memory interface 822 may comprise a cartridge interface, a memory socket, or a disk drive. Memory interface 822 may also be a floppy drive, an optical disk drive, a flash interface, or any other type of memory interface. In certain embodiments, memory interface may be used to perform the booting, initiating, receiving, identifying, downloading, and/or other steps and features described herein.

As illustrated in FIG. 8, computer system 810 may also comprise at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824. Examples of display device 824 include, without limitation, CRT monitors, LCD screens, plasma screens, video projectors, and the like.

As illustrated in FIG. 8, exemplary computer system 810 may also comprise at least one input device 828 coupled to communication infrastructure 812 via an input interface 830. Input device 828 generally represents any type or form of user input device capable of providing input, either computer or human generated, to exemplary computer system 810. Examples of input device 828 include, without limitation, a keyboard, a pointing device, a speech recognition device, or any other input device known to those skilled in the art. In at least one embodiment, input device 828 may be used for the booting, initiating, receiving, identifying, downloading, and/or other steps and features described herein.

As illustrated in FIG. 8, exemplary computer system 810 may also comprise a storage device 836 coupled to communication infrastructure 812 via a storage interface 838. Storage device 836 generally represents any type or form of storage device or medium capable of storing data and/or other computer-readable instructions. For example, storage device 836 may be a magnetic disk drive (e.g., a so-called hard drive), a floppy disk drive, a magnetic tape drive, an optical disk drive, a flash drive, or the like. In certain embodiments, storage device 836 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 836 may also comprise other similar structures for allowing computer software, data, or other computer-readable instructions to be loaded into computer system 810. For example, storage device 836 may be configured to read and write software, data, or other computer-readable information. Storage device 836 may also be a part of computer system 810 or may be separate device accessed through other interface systems. In certain embodiments, storage device 836 may be used for the booting, initiating, receiving, identifying, downloading, and/or other steps and features described herein.

In at least one embodiment, computer system 810 may also comprise a host bus adapter (HBA) interface card 840 and a HBA card 844. HBA card 840 may be operative to connect with a fiber channel network 842, and HBA card 844 may be operative to connect to a SCSI bus 846. HBA cards 840 and 842 may used for the booting, initiating, receiving, identifying, downloading, and/or other steps and features described herein.

In certain embodiments, computer system 810 may be any kind of computing device, including personal data assistants (PDAs), network appliances, X-WINDOW terminals, or other such computing devices. Computer system 810 may also be any type of device configured to execute the functions and modules described and/or illustrated herein. For example, computer system 810 may create an deploy images. Computer system 810 may be a source computer, a destination computer, a server, or any other computing device discussed herein.

The operating system provided on computer system 810 may be MS-DOS, MS-WINDOWS, OS/2, UNIX, LINUX, or any other operating system or platform. Computer system 810 may also support a number of Internet access tools; including, for example, an HTTP-compliant web browser having a JavaScript interpreter, such as NETSCAPE NAVIGATOR, MICROSOFT INTERNET EXPLORER, or other similar navigators.

Many other devices or subsystems may be connected to computer system 810. Conversely, all of the devices shown in FIG. 8 need not be present to practice the embodiments descried and/or illustrated herein. The devices and subsystems referenced above may also be interconnected in different ways from that shown in FIG. 8. Indeed, computer system 810 may use any number of software, firmware, and/or hardware configurations. For example, one or more of the exemplary embodiments disclosed herein may be encoded as a computer program (also referred to as computer software, software applications, computer-readable instructions, or computer control logic) and stored in a computer-readable medium. The computer-readable medium containing the computer program may then be loaded into computer system 810 using a removable storage drive or downloaded to computer system 810 via communication interface 820 over a communication path, such as the Internet or other network. All or a portion of the computer program stored on the computer-readable medium may then be stored in system memory 816 and/or various portions of storage device 836. According to certain embodiments, a computer readable medium may be an optical storage device, a magnetic storage device, a carrier wave signal carrying computer readable instructions, or any other storage device capable of storing computer readable instructions. When executed by processor 814, a computer program loaded into computer system 810 may cause processor 814 to perform the functions of one or more of the exemplary embodiments described and/or illustrated herein.

Additionally or alternatively, one or more of the exemplary embodiments described and/or illustrated herein may be implemented in firmware and/or hardware. For example, one or more of the exemplary embodiments disclosed herein may be implemented using various hardware components such as, for example, application specific integrated circuits (ASICs).

Figure 9:
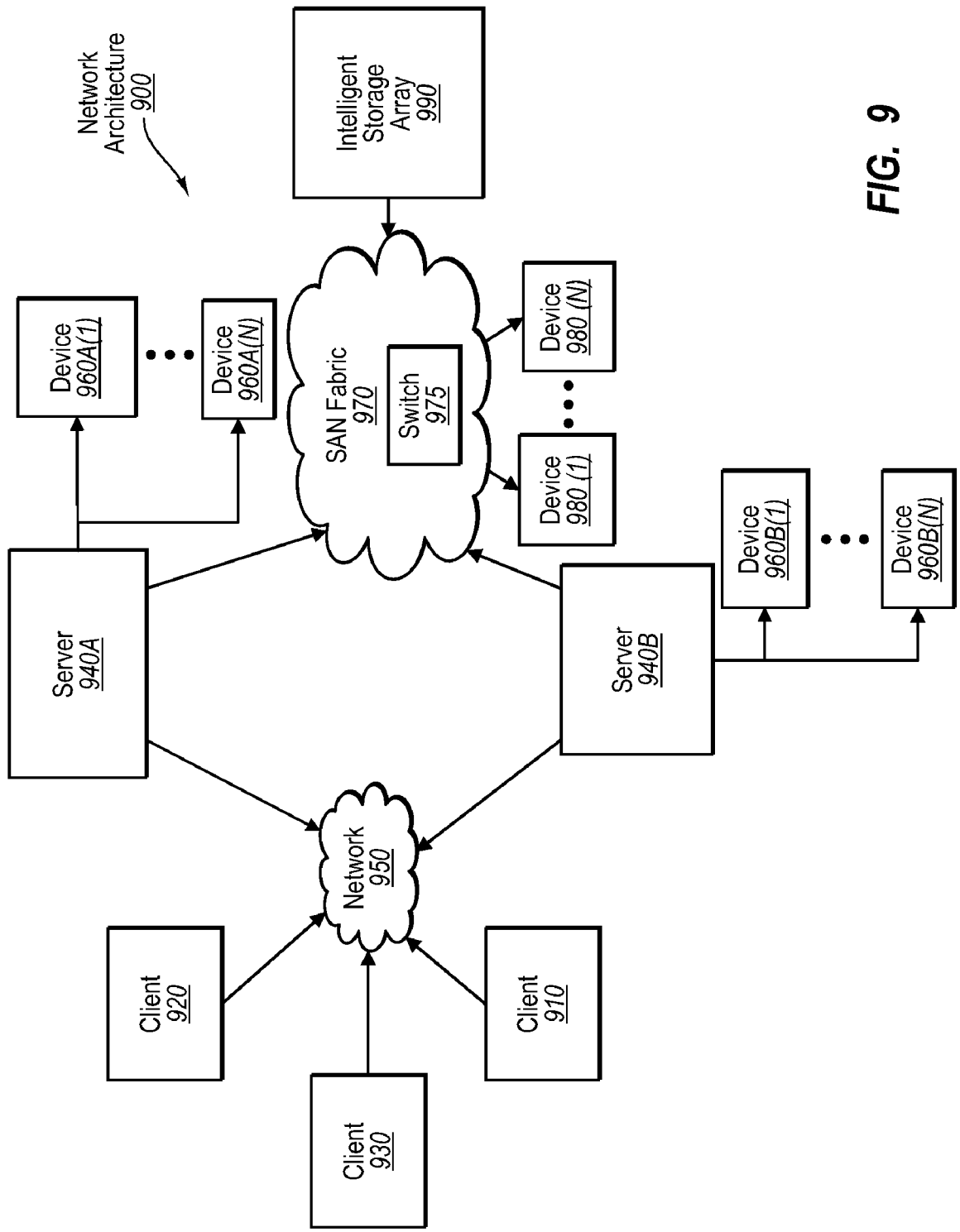
FIG. 9 is a block diagram of an exemplary network architecture capable of implementing one or more of the exemplary embodiments described and/or illustrated herein.

FIG. 9 is a block diagram of an exemplary network architecture 900 in which client systems 910, 920, and 930, as well as storage servers 940A and 940B (any of which can be implemented using computer system 810), may be coupled to a network 950. As illustrated in this figure, storage server 940A may also comprise one or more storage devices 960A(1)-(N) directly attached thereto. Similarly, storage server 940B may comprise one or more storage devices 960B(1)-(N) directly attached thereto. In certain embodiments, storage servers 940A and 940B may be connected to a Storage Area Network (SAN) fabric 970, although connection to a storage area network is not required for operation of the embodiments described and/or illustrated herein. SAN fabric 970 may support access to storage devices 980(1)-(N) by storage servers 940A and 940B and by client systems 910, 920, and 930 via network 950. Intelligent storage array 990 is also shown as an example of a specific storage device accessible via SAN fabric 970.

In certain embodiments, and with reference to exemplary computer system 810, communication interface 820 (or some other method) may be used to provide connectivity from each client system 910, 920, and 930 to network 950. Client systems 910, 920, and 930 may be able to access information on storage server 940A or 940B using, for example, a web browser or other client software. Such software may allow client systems 910, 920, and 930 to access data hosted by storage server 940A, storage server 940B, storage devices 960A(1)-(N), storage devices 960B(1)-(N), storage devices 980(1)-(N), or intelligent storage array 990. Although FIG. 9 depicts the use of a network such as the Internet for exchanging data, the embodiments described and/or illustrated herein are not limited to the Internet or any particular network-based environment.

Storage servers 940A and 940B generally represent computing devices, such as an application servers or database servers, configured to provide various database services and/or to run certain software applications. Similarly, storage devices 960A(1)-(N), storage devices 960B(1)-(N), storage devices 980(1)-(N), and intelligent storage array 990 generally represent any type or form of storage device or medium capable of storing data and/or other computer-readable instructions.

In at least one embodiment, all or a portion of one or more of the exemplary embodiments disclosed herein may be encoded as a computer program and loaded onto and executed by storage server 940A, storage server 940B, storage devices 960A(1)-(N), storage devices 960B(1)-(N), storage devices 980(1)-(N), intelligent storage array 990, or any combination thereof. All or a portion of one or more of the exemplary embodiments disclosed herein may also be encoded as a computer program, stored in server 940A, run by server 940B, and distributed to client systems 910, 920, and 930 over network 950. For example, network architecture 900 may perform the booting, initiating, receiving, identifying, downloading, and/or other steps and features described herein. Network architecture 900 may also include one or more of the server, the destination computer, and the source computer. In some embodiments, a disk image may be deployed over network architecture 900.

One or more of the exemplary embodiments described and/or illustrated herein may be implemented using various computer devices, systems, methods, and networks to provide features that simplify and improve disk image creating and deployment. For example, some embodiments include booting a destination computer in a pre-boot mode after a disk image comprising a first operating system is downloaded to the computer. Some embodiments also include downloading a driver to the destination computer before the destination computer is booted into the first operating system of the disk image for the first time. These features may allow an image to be deployed without all the necessary drivers for the devices of a destination computer. Thus, network resources may be conserved because large images containing numerous drivers for all types of hardware devices need not be deployed. In other words, these features may provide for hardware independent image deployment, but may not necessarily require adding a large number of driver files to an image. Furthermore, by including a set of mass storage drivers in the image, the image may be deployed to a destination computer that has a different mass storage device than the source computer. Thus, an image can be deployed to a destination computer having a significantly different hardware configuration than the source computer used to create the image.

As used herein, the steps involved in disk image deployment may or may not include the step of downloading a disk image to a destination computer. Thus, many of the deployment features of embodiments discussed herein may be performed by a software module that complements a disk image deployment application, but does not actually perform the steps of creating or downloading a disk image. In some embodiments, the deployment features of embodiments discussed herein may be an integral part of a disk image deployment solution.

One or more of the exemplary embodiments described and/or illustrated herein may also be implemented using software management and/or software deployment activities. Examples of software deployment activities include, without limitation, a software release, installation, activation, deactivation, update, uninstall, and/or retire. For example, software deployment may occur when a bundle of specific software, a collection of multiple software, or even an operating system, is distributed. Such a distribution may be accomplished through a third party distribution system.

Deployment may be a frequent occurrence for most large organizations and enterprises, and involves many challenges that may be addressed by a distribution system that incorporates one or more of the embodiments described and/or illustrated herein. Problems with deployment include unreliable rollouts that cause catastrophic crashes of mission-critical applications, unmanaged environments with no control over applications, processes, versions and licenses, non-standard configurations that raise the cost of maintaining PCs, and unreliable applications that frustrate end users and cause help desk calls, ultimately reducing IT and end-user productivity. Deployment programs and systems may incorporate the embodiments disclosed herein to address at least some of these issues. For example, a network manager may be able to efficiently deploy an image to multiple destination computers with different hardware configurations.

In addition, one or more of the embodiments disclosed herein may be incorporated into other software delivery solutions. For example, software delivery solutions may provide secure distribution of applications and updates throughout an organization. Incorporating the embodiments disclosed herein into a software delivery solution may provide additional efficiency for software distributions and updates.

While various principles disclosed herein have been depicted, described, and/or defined by reference to particular embodiments of the disclosure, such references do not imply a limitation on the disclosure, and no such limitation is to be inferred. The embodiments recited in this disclosure are capable of considerable modification, alteration, and equivalents in form and function, as will occur to those ordinarily skilled in the pertinent arts. The depicted and described embodiments are examples only, and are not exhaustive of the scope of the invention.

In addition, the foregoing disclosure sets forth various embodiments via the use of block diagrams, flowcharts, and examples. It will be understood by those within the art that each block diagram component, flowchart step, operation and/or component described and/or illustrated herein may be implemented, individually and/or collectively, by a wide range of hardware, software, firmware, or any combination thereof. The foregoing disclosure also describes embodiments including components contained within other components (e.g., the various elements shown as components of computer system 810). Such architectures are merely examples, and many other architectures can be implemented to achieve the same functionality. Similarly, the process parameters and sequence of steps described and/or illustrated herein are given by way of example only and can be varied as desired. For example, while the steps of FIGS. 1-9 are shown in a particular order, these steps do not necessarily need to be performed in the order illustrated.

Furthermore, while embodiments of the instant disclosure have been described in the context of fully functional computer systems, those skilled in the art will appreciate that one or more of the exemplary embodiments described and/or illustrated herein may be capable of being distributed as a program product in a variety of forms, regardless of the particular type of signal bearing media used to actually carry out the distribution. Examples of signal bearing media include recordable media such as floppy disks and CD-ROM, transmission type media such as digital and analog communications links, as well electronic storage media, magnetic storage media, optical storage media, communications medium conveying signals encoding instructions, and other distribution systems.

As previously mentioned, the above-discussed embodiments may be implemented by software modules and scripts that perform certain tasks. The software modules and scripts discussed herein may include script, batch, or other executable files. In addition, these software modules and scripts may be stored on a machine-readable or computer-readable storage medium, such as a disk drive. In some embodiments, the modules and scripts can be stored within a computer system memory to configure the computer system to perform the functions of the module. One or more of the steps discussed herein may be automated by a computer. In some embodiments, all of the steps performed by a module or application may be automated by a computer.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computerized method, comprising:
   downloading a set of mass storage drivers to a source computer;
   creating a disk image of the source computer;
   deploying the disk image to a destination computer;
   booting the destination computer in a pre-boot mode after the disk image is downloaded to the destination computer, the disk image comprising a first operating system;
   initiating an identification module in the pre-boot mode to identify a device of the destination computer;
   receiving a device identifier of the device of the destination computer;
   identifying, using the device identifier, a driver compatible with the device;
   downloading the driver to the destination computer before the destination computer is booted into the first operating system of the disk image for the first time.

2. The method of claim 1, further comprising:
   updating a system preparation file to reflect the set of mass storage drivers downloaded to the source computer;
   executing a system preparation utility on the source computer before imaging the source computer.

3. The method of claim 1, wherein the identification module outputs device identification numbers for each device of the destination computer.

4. The method of claim 3, wherein receiving a device identifier further comprises receiving device identifications for each device of the destination computer, and downloading the driver to the destination computer further comprises downloading drivers compatible with each device of the destination computer.

5. The method of claim 1, further comprising:
   receiving a hardware-abstraction-layer identifier of a hardware-abstraction layer of the destination computer;
   identifying a hardware-abstraction-layer file compatible with the hardware-abstraction layer of the destination computer;
   downloading the hardware-abstraction-layer file to the destination computer.

6. The method of claim 1, wherein receiving the device identifier, identifying the driver, and downloading the driver are each performed by a deployment server.

7. The method of claim 1 further comprising:
   downloading a platform identifier to the source computer before creating the disk image of the source computer, the platform identifier identifying a platform of the disk image;
   receiving the platform identifier from the destination computer;
   using the platform identifier, in addition to the device identifier, to identify the driver.

8. The method of claim 1, wherein identifying the driver further comprises comparing the driver identifier to a driver library index entry.

9. The method of claim 1, wherein the pre-boot mode is a command line mode.

10. The method of claim 1, wherein the first operating system of the disk image is a graphical-user-interface operating system.

11. A system for deploying a disk image, the system comprising:
    a processor operative to:
    download a set of mass storage drivers to a source computer;
    create a disk image of the source computer, the disk image comprising a first operating system;
    boot a destination computer in a pre-boot mode after the disk image is downloaded to the destination computer;
    initiate an identification module in the pre-boot mode to identify a device of the destination computer;

identify, using a device identifier of the device, a driver compatible with the device;
a communication interface operative to:
download the disk image to the destination computer;
receive the device identifier;
download the driver to the destination computer before the destination computer is booted into the first operating system of the disk image for the first time.

12. A computer readable storage medium, comprising:
a first set of computer-executable instructions operable to:
download a set of mass storage drivers to a source computer;
create a disk image of the source computer, the disk image comprising a first operating system;
deploy the disk image to a destination computer;
a second set of computer-executable instructions operable to:
boot the destination computer in a pre-boot mode after the disk image is downloaded to the destination computer;
initiate an identification module in the pre-boot mode to identify a device of the destination computer;
a third set of computer-executable instructions operable to receive a device identifier of the device of the destination computer;
a fourth set of computer-executable instructions operable to identify, using the device identifier, a driver compatible with the device;
a fifth set of computer-executable instructions operable to download the driver to the destination computer before the destination computer is booted into the first operating system of the disk image for the first time.

13. The computer readable storage medium of claim 12, further comprising:
a sixth set of instructions operable to receive a hardware-abstraction-layer identifier of a hardware-abstraction layer of the destination computer;
a seventh set of instructions operable to identify a hardware-abstraction-layer file compatible with the hardware-abstraction layer of the destination computer;
an eighth set of instructions operable to download the hardware-abstraction-layer file to the destination computer.

14. The computer readable storage medium of claim 12, further comprising:

a sixth set of instructions operable to download a platform identifier to the source computer before creating the disk image of the source computer, the platform identifier identifying a platform of the disk image;
a seventh set of instructions operable to receive the platform identifier from the destination computer;
an eighth set of instructions operable to use the platform identifier to identify the driver.

15. The computer readable storage medium of claim 12, wherein:
the identification module is configured to output device identification numbers for each device of the destination computer;
receiving a device identifier further comprises receiving device identifiers for each device of the destination computer;
downloading the driver to the destination computer further comprises downloading drivers compatible with each device of the destination computer.

16. A computerized method comprising:
downloading a platform identifier to a source computer before creating a disk image of the source computer, the platform identifier identifying a platform of the disk image;
creating a disk image of the source computer;
deploying the disk image to a destination computer;
booting the destination computer in a pre-boot mode;
identifying a device of the destination computer while the computer is in the pre-boot mode;
receiving the platform identifier from the destination computer;
identifying, based at least in part on the platform identifier, a driver compatible with the device;
downloading the driver to the destination computer before the destination computer is booted into the first operating system of the disk image for the first time.

17. The method of claim 16, further comprising:
receiving a model number of the destination computer, wherein identifying a device of the destination computer comprises identifying a device associated with the model number.

18. The method of claim 17, wherein downloading the driver to the destination computer further comprises downloading drivers compatible with each device associated with the model number.

* * * * *

UNITED STATES PATENT AND TRADEMARK OFFICE
CERTIFICATE OF CORRECTION

PATENT NO.        : 7,644,264 B1                                    Page 1 of 1
APPLICATION NO.   : 11/550327
DATED             : January 5, 2010
INVENTOR(S)       : Larry Olsen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 538 days.

Signed and Sealed this

Sixteenth Day of November, 2010

David J. Kappos
*Director of the United States Patent and Trademark Office*